United States Patent [19]

Hyodo et al.

[11] Patent Number: 5,012,277

[45] Date of Patent: Apr. 30, 1991

[54] IMAGE EXPOSURE DEVICE

[75] Inventors: Haruhiro Hyodo; Hideyuki Kurahashi, both of Osaka, Japan

[73] Assignee: Minolta Camera Kabushiki Kaisha, Osaka, Japan

[21] Appl. No.: 453,397

[22] Filed: Dec. 18, 1989

[30] Foreign Application Priority Data

Dec. 20, 1988 [JP] Japan ................................ 63-322993

[51] Int. Cl.[5] ........................ G03B 27/52; G03B 27/72

[52] U.S. Cl. .......................................... 355/55; 355/71

[58] Field of Search ...................... 355/58, 67, 71, 235, 355/55, 56, 60

[56] References Cited

U.S. PATENT DOCUMENTS

| | | | |
|---|---|---|---|
| 4,057,332 | 11/1977 | Allis | 355/235 |
| 4,125,323 | 11/1978 | Ikeda et al. | 355/71 X |
| 4,172,658 | 10/1979 | Tani et al. | 355/71 X |
| 4,243,312 | 1/1981 | Ogawa | 355/235 |
| 4,806,989 | 2/1989 | Saito et al. | 355/71 X |

FOREIGN PATENT DOCUMENTS

| | | |
|---|---|---|
| 58-68062 | 4/1983 | Japan . |
| 56-125773 | 4/1983 | Japan . |
| 60-112238 | 7/1985 | Japan . |
| 62-179733 | 11/1987 | Japan . |

*Primary Examiner*—L. T. Hix
*Assistant Examiner*—D. Rutledge
*Attorney, Agent, or Firm*—Price, Gess & Ubell

[57] ABSTRACT

A device for amending a non-uniform illuminance of an image projected on an photoconductive drum, the device comprising a first shielding member provided between a glass document table and a projecting lens for shielding a portion of a light beam from a peripheral portion of a document image partially in a reduction mode, and a second shielding member provided between the projecting lens and the photoconductive drum for shielding another portion of the light beam from a central portion of the document image partially in an enlargement mode.

20 Claims, 9 Drawing Sheets

IMAGE EXPOSURE DEVICE

BACKGROUND OF THE INVENTION (1) Field of the Invention

This invention relates to an image exposure device for use in an image forming device like a copier or a facsimile machine, or in an image reading device. More precisely, it relates to a device for exposing a document image and projecting a reflected light therefrom to a light-projected member like a photoconductive drum or a light receiving element through a lens, the device having a function of changing magnification ratios.

(2) Description of the Related Art

When a document image which is exposed by a uniform light amount is projected on a light-projected member like a photoconductive drum through a lens, the projected image has a lower illuminance on its peripheral portion than on its central portion. As a result, an image with a non-uniform illuminance is formed.

To solve this problem, document-exposing members like an exposure lamp and a reflecting mirror have been improved so that a larger amount of light may be irradiated on a peripheral portion of the document image than to a central portion thereof.

However, in a device like a copier which has a function of changing the magnification ratios, the distances between the document and the lens and between the lens and the light-projected member change as a accordance with the magnification ratio. In consequence, even if the document-exposing member is controlled to irradiate a uniform light amount during a same-size mode, a larger amount of light will be irradiated on the peripheral portion than on the central portion in a reduction mode.

U.S. Pat. No. 4,172,658 discloses a copier for solving the above problem in the following manner. A light amount for exposing an image of a document is set so that the projected image has a uniform illuminance during the same-size mode. A shielding board is provided between the lens and the document, and a light from the peripheral portion of the document is partially shielded by moving the board for reduction, whereby the non-uniform illuminance is varied. When this construction, in which light correction is only possible for reduction, is used in a device with a function of magnifying over a wide range of ratios, for example, a function of enlarging and reducing, the document exposing member needs to be controlled to irradiate a uniform light amount at the highest magnification ratio so that the light irradiated on the peripheral portion be shielded by the shielding board at lower magnification ratios for illuminance adjustment. Accordingly, a considerable amount of light should be shielded during low magnification ratios and also in the frequently-used same-size mode (when the device has a function of enlarging and reducing). In a state where a great amount of light is shielded as the above, it requires an exposure lamp with a high light capacity to expose the document properly. This will increase power consumption, heighten the temperatures of the document, the glass document table and other members excessively, and raise manufacturing cost because a higher quality exposure lamp is necessary.

The Japanese Patent Publication Kokai No. 58-68062 discloses a copier in which an amending board is provided near the lens for shielding a light from the central portion of the document partially. In this copier, the amending board is integrally moved with the lens so that the board may keep the same distance with the lens while magnification ratios are changed. Although this construction may restrict, to some extent, the non-uniformity of illuminance caused by changing the magnification ratios, it cannot keep a uniform illuminance at all magnification ratios. Furthermore, since a considerable amount of light is continuously shielded by the amending board, this construction also has the problems that power consumption is increased, the temperatures of the document, the glass document table and other members are excessively raised, and manufacturing cost is increased because a higher quality exposure lamp is necessary.

SUMMARY OF THE INVENTION

Accordingly, an object of this invention is to provide an improved image exposure device.

Another object of this invention is to provide an image exposure device for use in a copier or a facsimile machine having a function of changing magnification ratios, wherein a non-uniform illuminance is amended with high accuracy at any ratio.

Still another object of this invention is to provide an image exposure device wherein, as well as a projected image with a uniform illuminance is obtained, the light amount loss due to the illuminance amendment is small.

The above objects are fulfilled by a device for exposing a document image and projecting a reflected light therefrom to a projection surface through a lens, comprising supporting means for supporting a document; irradiating means for irradiating a light on a document image of the document supported by the supporting means; a projection surface on which the document image is to be projected; a lens for receiving a reflected light from the document image and passing the reflected light onto the projection surface; lens driving means for moving the lens to change a size ratio of a projected image on the projection surface against the document image; a first shielding member disposed on an optical path between the supporting means and the lens for compensating a non-uniformity of a light amount irradiated on the projection surface; and a second shielding member disposed on the optical path between the lens and the projection surface for compensating a non-uniformity of the light amount irradiated on the projection surface.

The first shielding member may have a shape with which the first shielding member reduces the light amount mainly from a peripheral portion of the document image and the second shielding member may have a different shape with which the second shielding member reduces the light amount mainly from a central portion of the document image.

The device may further comprise retracting means for retracting at least one of the first and second shielding members from the optical path in accordance with a position of the lens.

The retracting means may retract the second shielding member from the optical path when the lens is moved over a first specified position toward the projection surface along the optical path.

The retracting means may retract the first shielding member from the optical path when the lens is moved over a second specified position toward the supporting means along the optical path, the second specified position being between the first specified position and the projection surface on the optical path.

The retracting means may retract both of the first and second shielding members from the optical path when the projected image on the projection surface and the document image are 1:1 in size.

The second shielding member may be provided integrally with the lens for integral movement therewith.

The lens driving means may move the lens to vary distances between the lens and the first shielding member and between the lens and the second shielding member.

The above objects are also fulfilled by a device for exposing a document image and projecting a reflected light therefrom to a projection surface through a lens, wherein projection magnification is changeable substantially steplesswise, the device comprising supporting means for supporting a document; irradiating means for irradiating a light on a document image of the document supported by the supporting means; a projection surface on which the document image is to be projected; a lens for receiving the reflected light from the document image and passing the reflected light onto the projection surface; a first shielding member disposed at a specified position on an optical path between the supporting means and the lens for shielding the reflected light partially when the image is reduced in size and projected on the projection surface; a second shielding member disposed at another specified position on the optical path between the lens and the projection surface for shielding the reflected light partially when the document image is enlarged in size and projected on the projection surface; and moving means for moving the lens so as to change positional relationship between the first and second shielding members with the lens.

The device may further comprise prohibiting means for prohibiting the second shielding member from operating when the image of the document is reduced in size and projected on the projection surface and for prohibiting the first shielding member from operating when the image of the document is enlarged in size and projected on the projection surface.

According to the present invention, the first shielding member is operated to partially shield the light beam from the peripheral portion of the document in accordance with the position of the projecting lens in the reduction mode, and the second shielding member is operated to partially shield the light beam from the central portion of the document in accordance with the position of the projecting lens in the enlargement mode. This construction solves the problem that: even if the illuminance of the image on the projection plane is controlled to be uniform at a ratio between the maximum and the minimum ratios, the peripheral portion of the image has a higher illuminance than the central portion at the lower ratios and has a lower illuminance at the higher ratios. As a result, the non-uniform illuminance on the image is amended at any ratio.

Moreover, the device according to this invention can be constructed so that partial or a large-amount of shielding of the light having passed through the projecting lens is usually unnecessary. Accordingly, the light amount loss is small, and therefore an exposure lamp with a smaller amount of light capacity is usable. This eliminates the problems of large power consumption, excessive increase of the temperatures of the document, the glass document table and other members, and high manufacturing cost.

As has been described so far, this invention provides a high quality image exposure device wherein a non-uniform illuminance is amended with high accuracy at any ratio to obtain a projected image with a uniform illuminance, and also the light amount loss due to the illuminance amendment is small

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DETAILED DESCRIPTION OF PREFERRED EMBODIMENTS

A first embodiment according to the present invention will be described referring to FIGS. 1 through 11.

Figure 1:
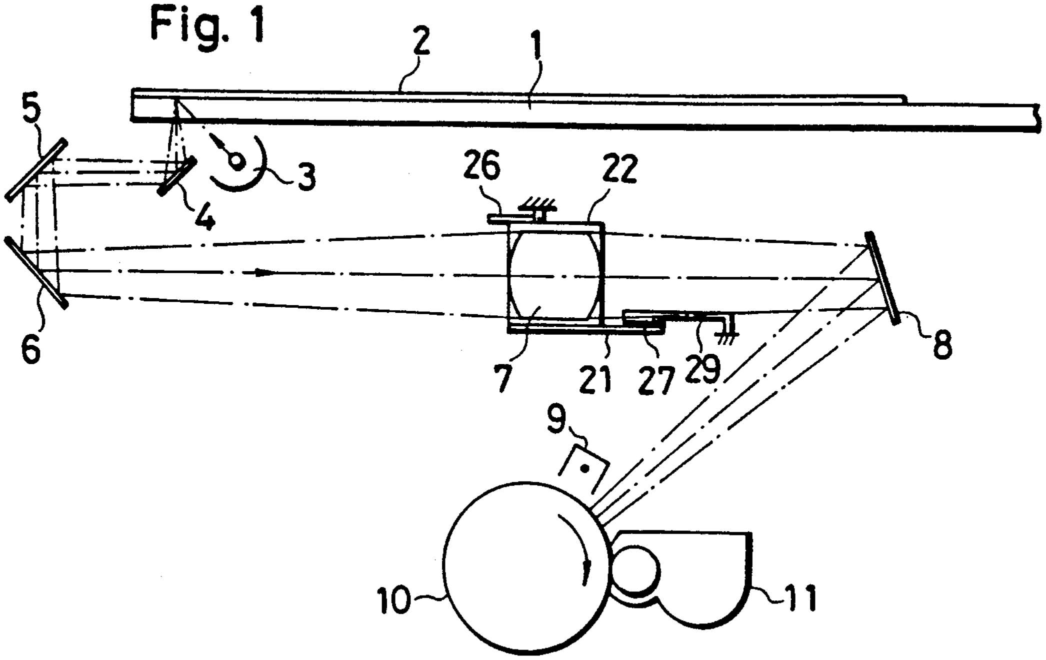
FIG. 1 is a schematic diagram of an exposure optical system of a first embodiment according to this invention.

FIG. 1 is a schematic diagram of an exposure optical system. A glass document table 1 has a document 2 placed thereon. A lighting equipment or assembly 3 comprising an exposure lamp for illuminating the document 2 and a reflecting mirror, and a first mirror 4 are mounted on a scanning plate not shown. Second and third mirrors 5 and 6 are mounted on a moving plate 21 moving half as fast as the scanning plate. 7 refers to a projecting lens which is movable for changing magnification ratios, and 8 refers to a fixed fourth mirror. The focal distance of the lens 7 used in this embodiment is 150 mm. In the above exposure optical system, a photoconductive drum 10 uniformly charged by a main charger 9 is exposed to form an electrostatic latent image thereon, and this electrostatic latent image is developed by a developing device 11.

Figure 2:
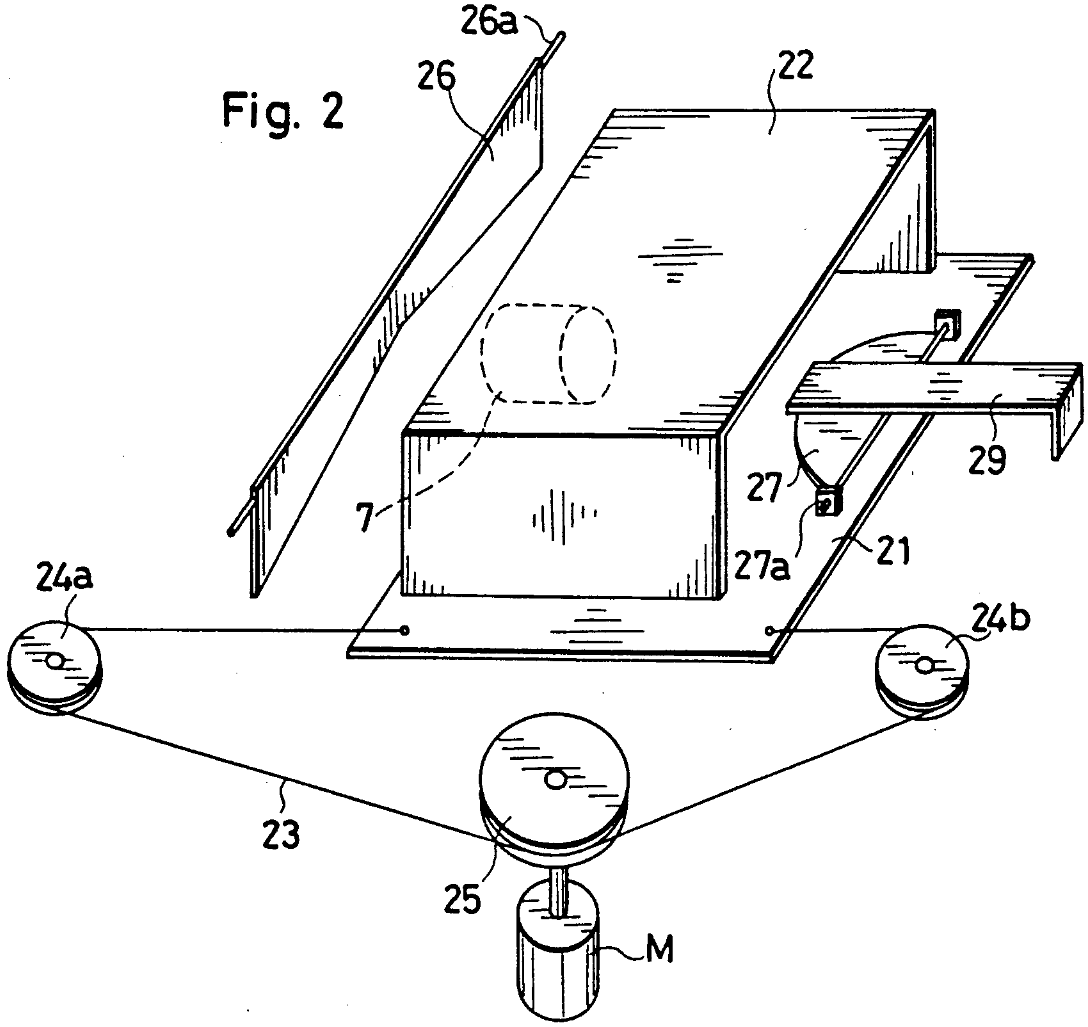
FIG. 2 is a perspective view of an essential part of the first embodiment during a reduction mode.
Figure 3:
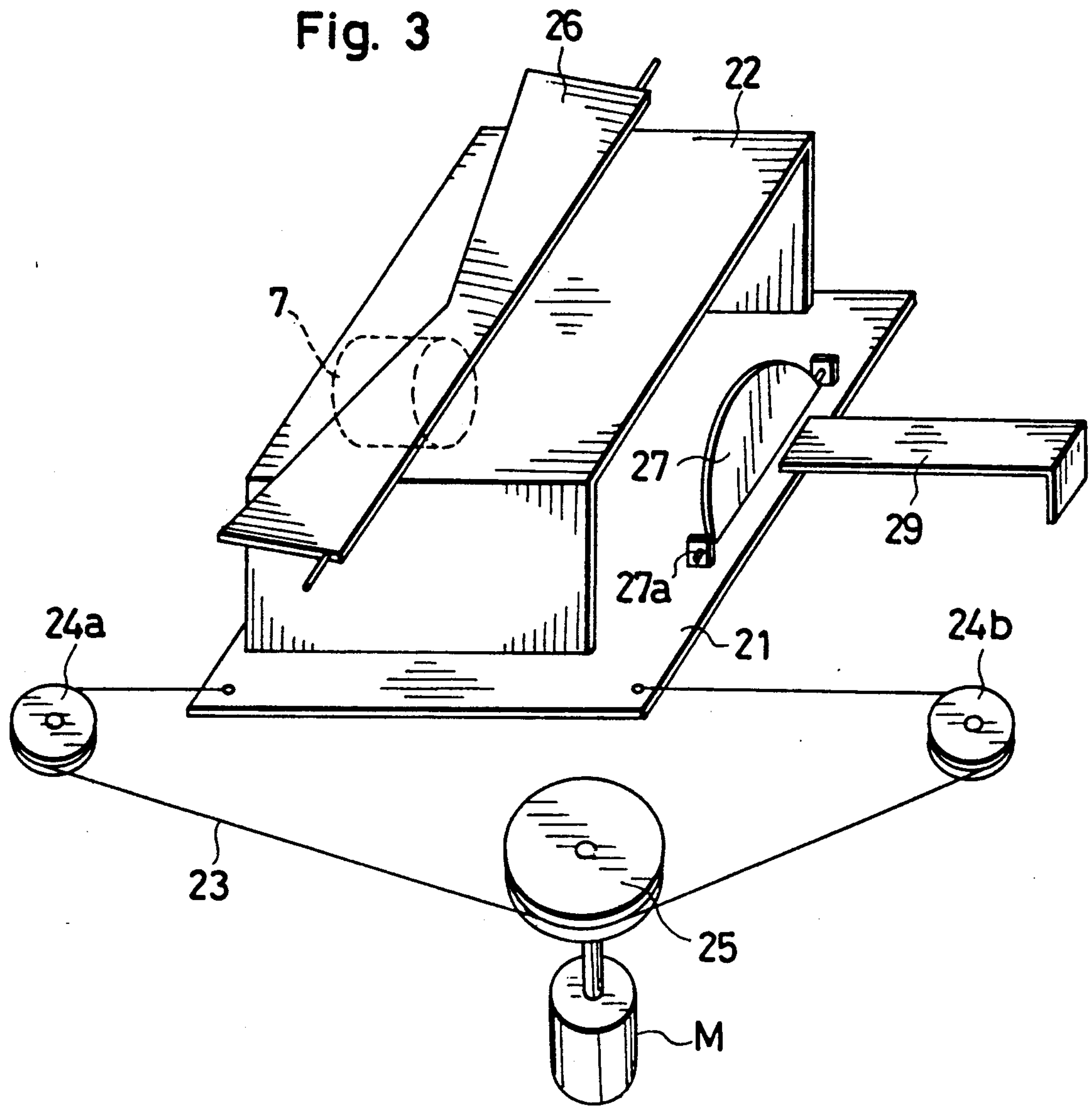
FIG. 3 is a perspective view of the same during an enlargement mode.
Figure 4:
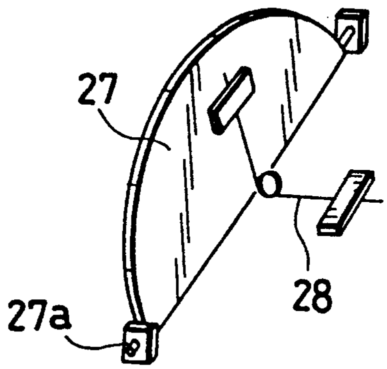
FIG. 4 is a perspective view of a second shielding member of the first embodiment.

In FIGS. 1 through 3, the projecting lens 7 is mounted on the moving plate 21 to be movable for changing the magnification ratios and is covered by a shielding cover 22. The moving plate 21 is to be moved to the left (FIGS. 2 and 3) for enlargement and to the right for reduction. The moving plate 21 is connected with a driving pulley 25 driven by a driving motor M through a wire 23, which runs around by the pulley 25 and guiding pulleys 24a and 24b; the pulleys 24a and 24b being provided outside a moving area of the moving plate 21. In this construction, the power of the driving motor M is conveyed to the moving plate 21 through the wire 23, whereby to move the moving plate 21, the shielding cover 22 and the projecting lens 7 integrally. The operation of the driving motor M is controlled by a signal from a control circuit (not shown), and optional magnification ratios can be substantially set steplesswise from 50 to 200%.

26 is a first shielding member for shielding a peripheral portion of a light beam passing through the projecting lens 7 when positioned onto an optical path. The member 26 is pivotally hung by its own weight from a frame (not shown) with a rotating shaft 26a, to be positioned onto the optical path. When the moving plate 21 is moved to the left, the member 26 is to be pushed up by a shielding cover 22 to be retracted from the optical path. Namely, the shielding cover 22 functions as retracting means.

27 is a second shielding member for shielding a central portion of the light beam when positioned onto the optical path. The member 27 is energized by a spring 28 (FIG. 4) attached on its surface opposed to the projecting lens 7 to pivotally stand on the moving plate 21, whereby the member 27 is positioned onto the optical path. When the moving plate 21 is moved to the right, the member 27 is to be laid down by an L-shaped plate 29, which is fixed on the frame, against the force of the spring 28. Namely, the L-shaped plate 29 functions as retracting means.

In an image exposure device having the above construction, when the light equipment 3 illuminates the document 2 uniformly, the image on the photoconductive drum 10 has a lower illuminance on its peripheral portion than on its central portion (FIG. 5a) since the illuminance of the peripheral portion is in proportion to $\cos^4$(angle of view). To solve this problem, the lighting equipment 3 is constructed so that the document 2 may have a higher illuminance on its peripheral portion than on its central portion (FIG. 5b), whereby to expose the photoconductive drum 10 with a uniform light amount when the device is in a same-size mode (the solid line of FIG. 5c).

In this way, the photoconductive drum 10 has an image having a uniform illuminance thereon during the same-size mode. However, the peripheral portion has a higher illuminance than the central portion during the reduction mode (the chained line of FIG. 5c) and has a lower illuminance during the enlargement mode (the dashed line of FIG. 5c). This non-uniform illuminance during the reduction and enlargement modes is amended by the first shielding member 26 in the former and by the second shielding member 27 in the latter for the following reason.

Figure 5A:
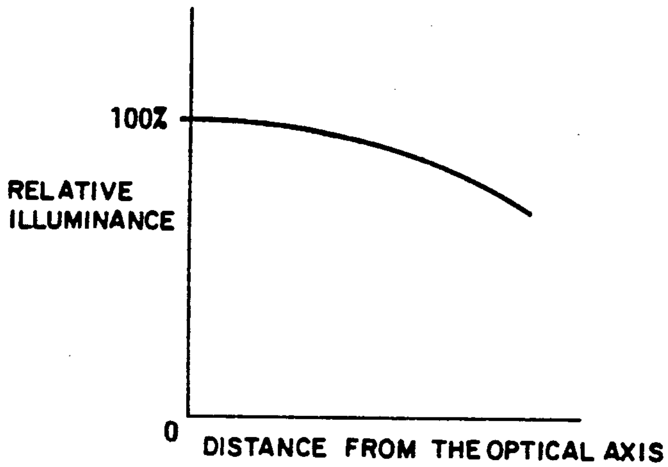
FIGS. 5*a*, 5*b* and 5*c* are graphs showing illuminance distributions on an image on a projection plane.
Figure 5B:
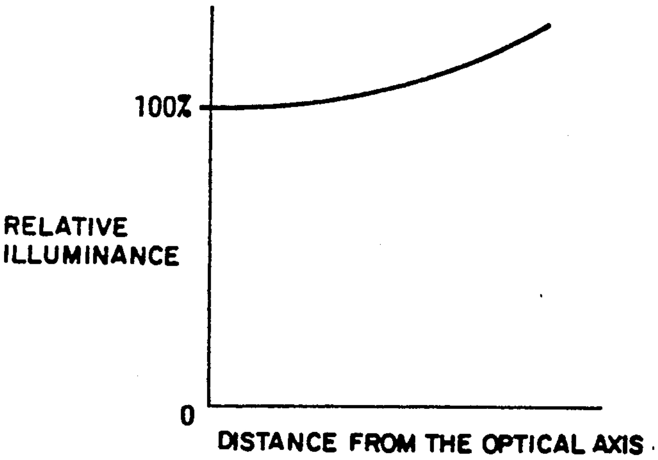
Figure 5C:
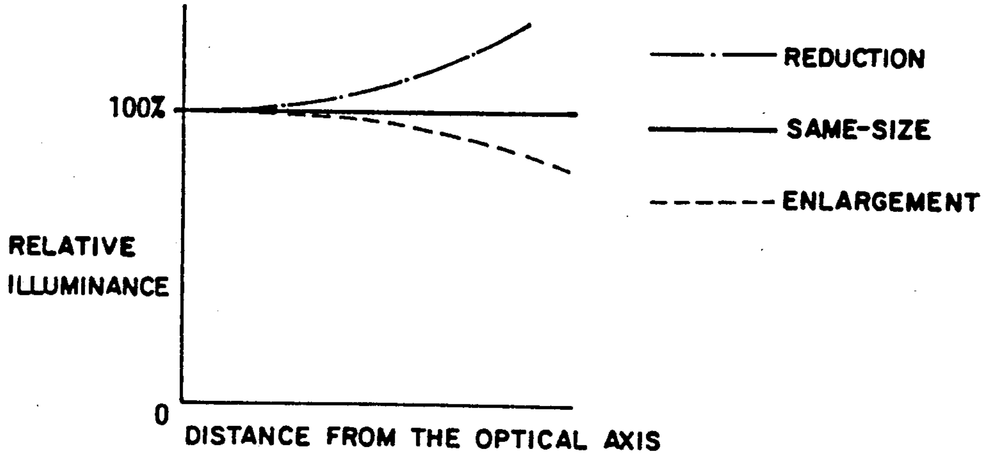
Figure 6:
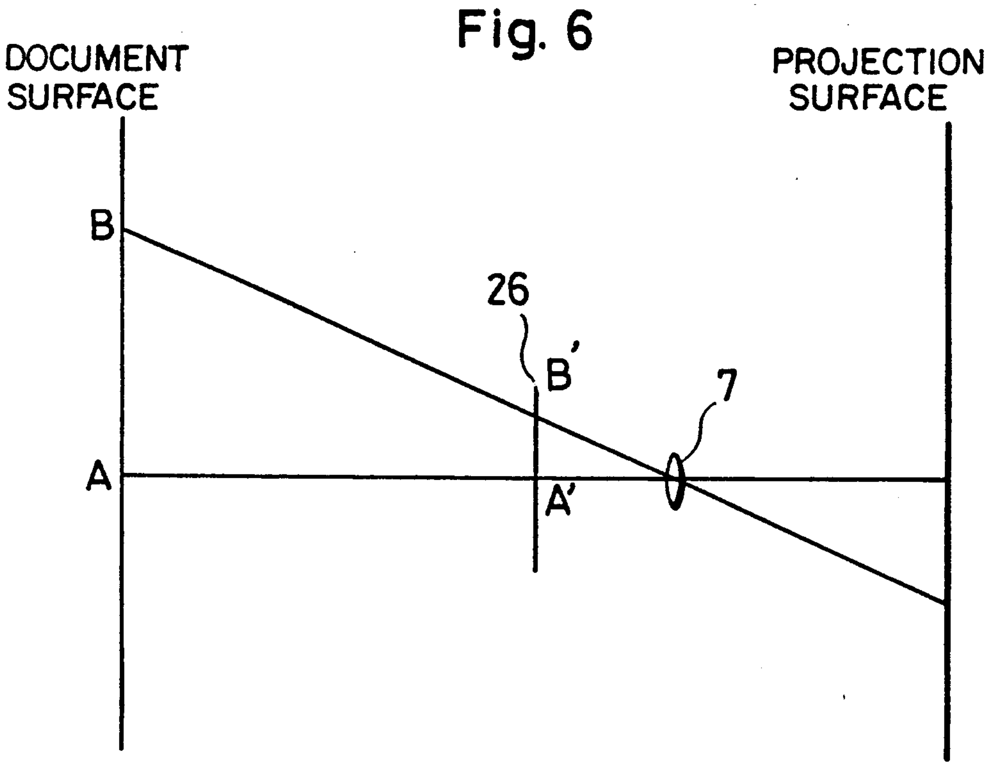
FIGS. 6, 7*a* and 7*b* show shielding conditions of light from two different positions of a document of the first embodiment in the reduction mode.
Figure 7A:
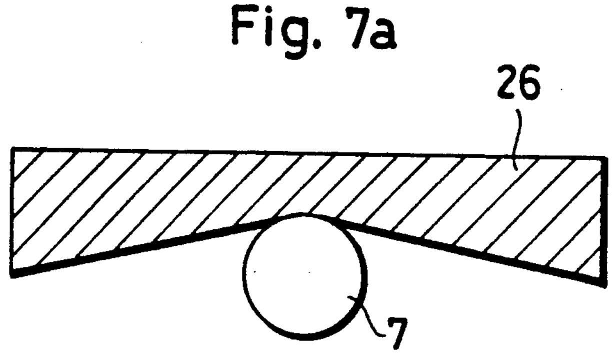
Figure 7B:
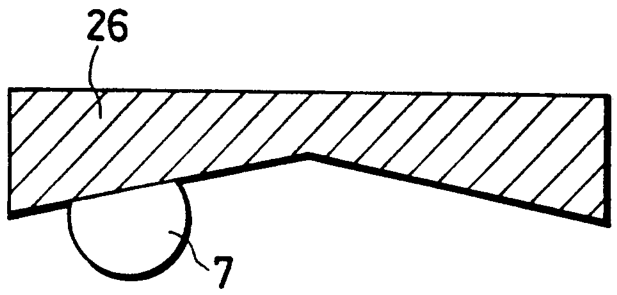

During the reduction mode, an image surface of the document 2, the projecting lens 7 and the first shielding member 26 are relatively positioned as shown in FIG. 6. A portion of the light beam from the central portion A of the document 2 passes through a neighborhood of a central portion A' of the first shielding member 26, and another portion of the light beam from the peripheral portion B of the document 2 passes through a neighborhood of a peripheral portion B' of the first shielding member 26. Accordingly, the projecting lens 7 and the first shielding member 26 are seen as shown in FIG. 7a from the central portion A and as shown in FIG. 7b from the peripheral portion B. As apparent from these figures, the light beam portion from the central portion A is not shielded at all while the light beam portion from the peripheral portion B is partially shielded. As a result, the non-uniform illuminance shown with the chained line of FIG. 5c is amended.

Figure 8A:
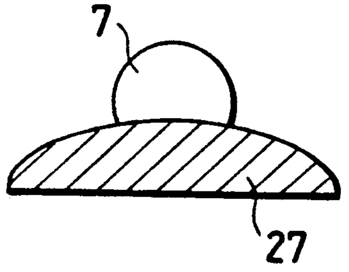
FIGS. 8*a* and 8*b* show shielding conditions of the same during the enlargement mode.
Figure 8B:
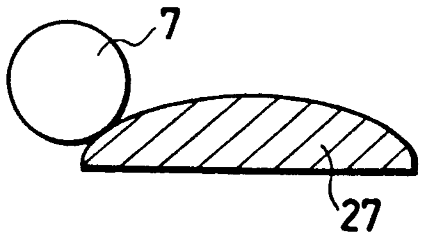

During the enlargement mode, the light beam portion from the central portion A passes through a neighborhood of a central portion of the second shielding member 27, and the light beam portion from the peripheral portion B passes through the neighborhood of a peripheral portion of the second shielding member 27. Accordingly, the projecting lens 7 and the second shielding member 27 are seen as shown in FIG. 8a from the central portion A and as shown in FIG. 8b from the peripheral portion B. As apparent from these figures, the light beam from the central portion A is partially shielded while the light beam from the peripheral portion B is not shielded at all. As a result, the non-uniform illuminance shown with the dashed line of FIG. 5c is amended.

Figure 10:
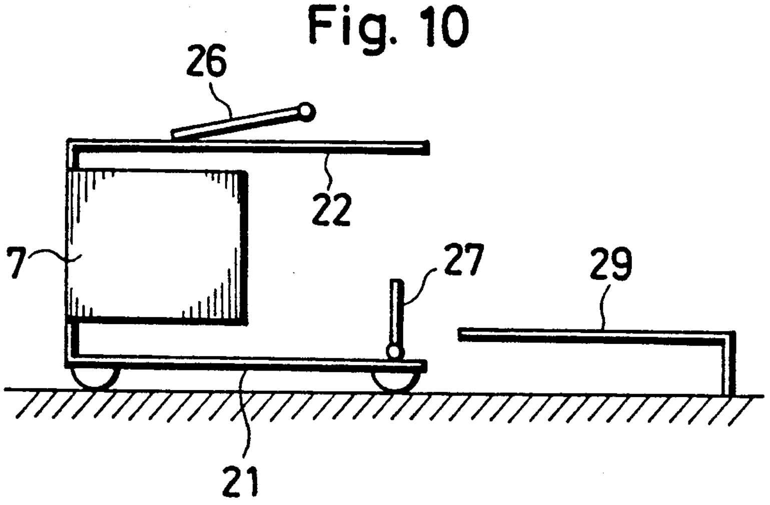
Figure 11:
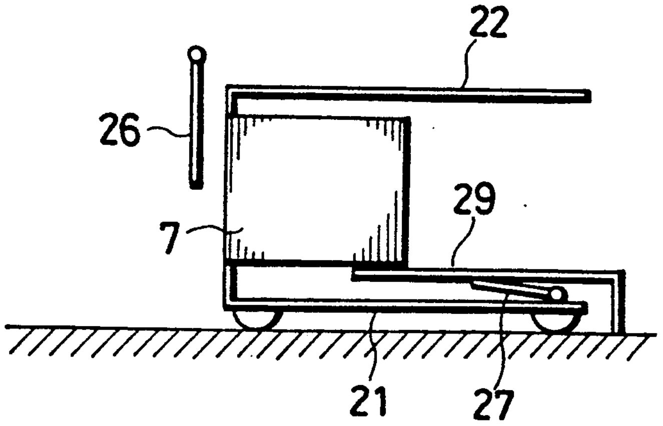
Figure 12:
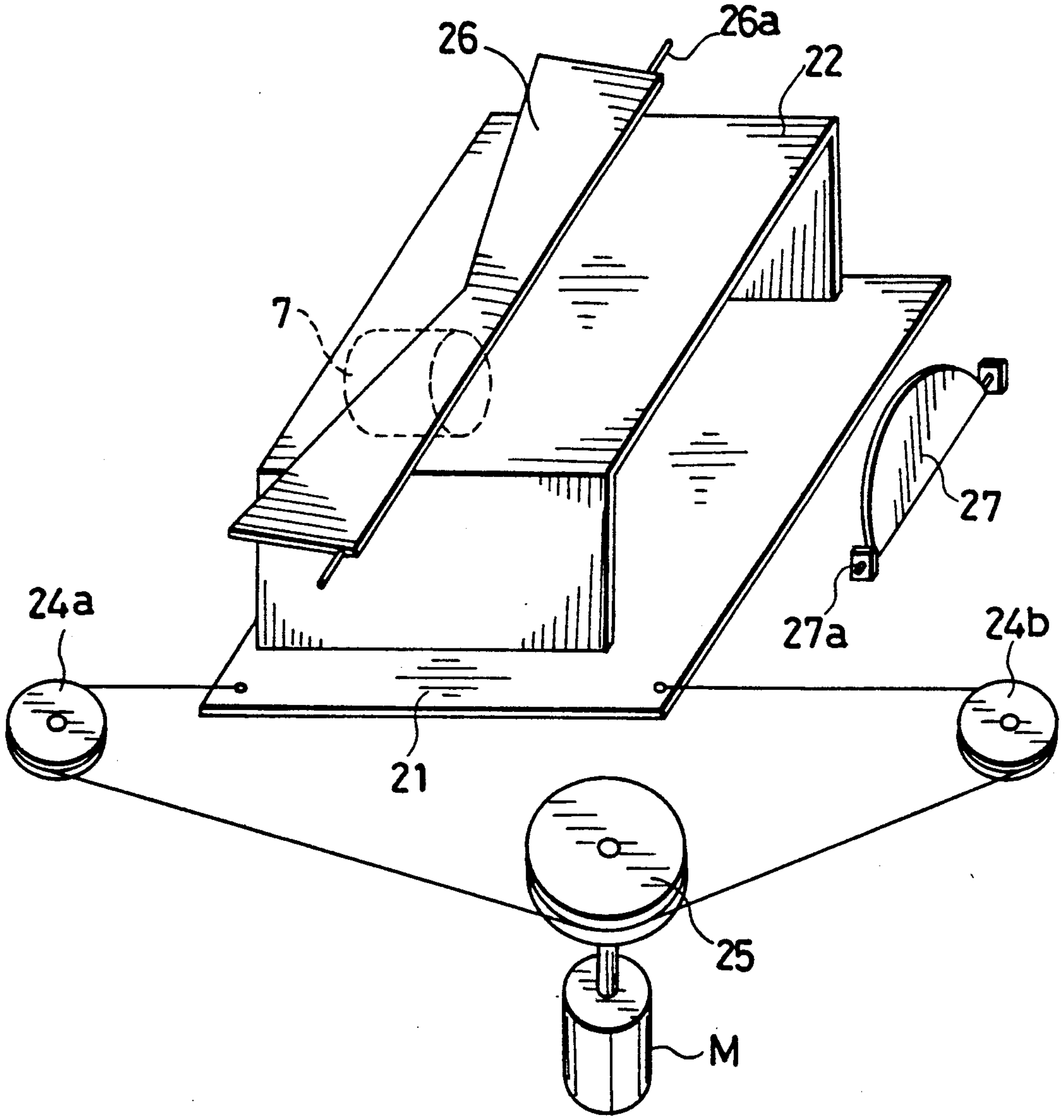
FIG. 12 is a perspective view of an essential part of a second embodiment during the enlargement mode.

Next, how the first and second shielding members 26 and 27 are switched over alternately will be described referring to FIGS. 9 through 11.

During the same-size mode (FIG. 9), there is no need for illuminance amendment. Therefore, the first shielding member 26 is on the shielding cover 22 to be retracted from the optical path, and the second shielding member 27 is under the L-shaped plate 29 also to be retracted from the optical path.

For enlargement (FIGS. 3 and 10), the projecting lens 7 is moved toward the document 2 (to the left), and the second shielding member 27 comes off from the L-shape plate 29 and stand by the force of the spring 28, whereby shielding the light beam portion from the central portion A partially. The first shielding member 26 is on the shielding cover 22 and does not function.

For reduction (FIGS. 2 and 11), the projecting lens 7 is moved away from the document 2 (to the right), and the first shielding member 26 comes off from the cover 22 and is hung by its own weight from the frame, whereby shielding the light beam portion from the peripheral portion B partially. The second shielding member 27 is under the L-shaped plate 29 and does not function.

Figure 9:
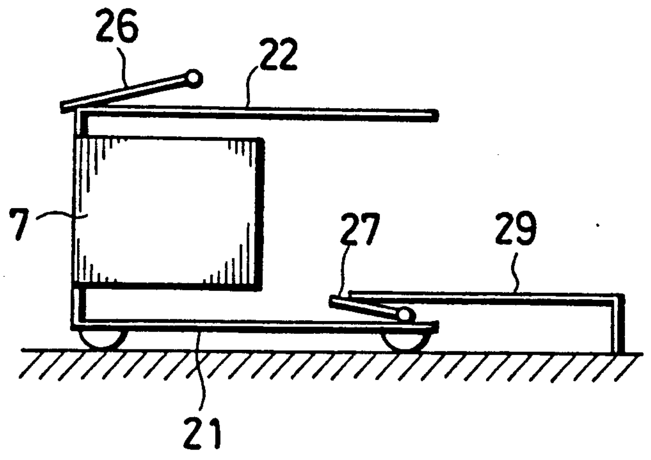
FIGS. 9 through 11 show shielding operations of the first embodiment during the same-size, enlargement and reduction modes, respectively.

The projecting lens 7, the members 26 and 27 return to their positions in FIG. 9 when the device is put into the same-size mode.

The above embodiment is constructed so that there may be no need for illuminance amendment when the device is in the same-size mode. Another construction is also possible wherein there may be no need for amendment when the device is in a mode of magnifying at a specified key ratio (for example, at an approximately middle value between the maximum and minimum magnification ratios of the device. In this case, the first shielding member 26 functions when the device is magnifying at higher ratios than the key ratio and the second shielding member 27 function when the device is magnifying at lower ratios than the key ratio.

It is desirable that the first and second shielding members 26 and 27 have already been operated when the illuminance distribution starts diversifying drastically or when such frequently-used magnification ratio as 71%, 100% or 141% is used. More precisely, the members 26 and 27 of this embodiment are positioned so that they may become practically effective when the image is magnified at 120% and 90% respectively. As a result, the maximum and minimum amounts of the light irradiated on the photoconductive drum 10 are different from each other by 5% or less at any magnification ratio.

Although the second shielding member 27 is placed on the frame in the first embodiment, it may also be hung from the frame using a shaft as the member 26.

A second embodiment of this invention will be described referring to FIGS. 12 through 15. This embodiment is different from the first embodiment only in that the second shielding member 27 as well as the first shielding member 26 is attached to the frame to eliminate the L-shaped plate 29. The construction and the operation are the same as those of the first embodiment.

Figure 13:
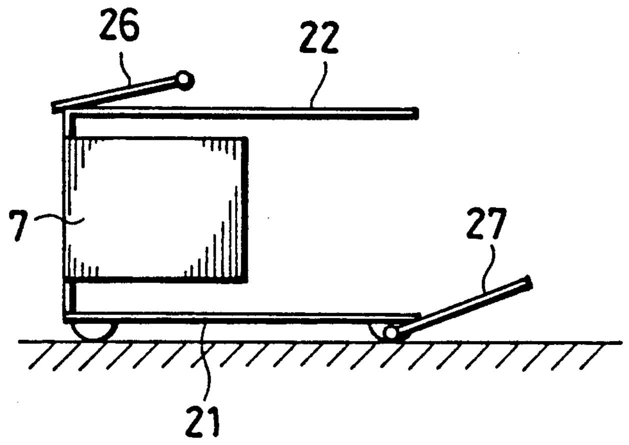
FIGS. 13 through 15 show shielding operations of the second embodiment during the same-size, enlargement and reduction modes, respectively.
Figure 14:
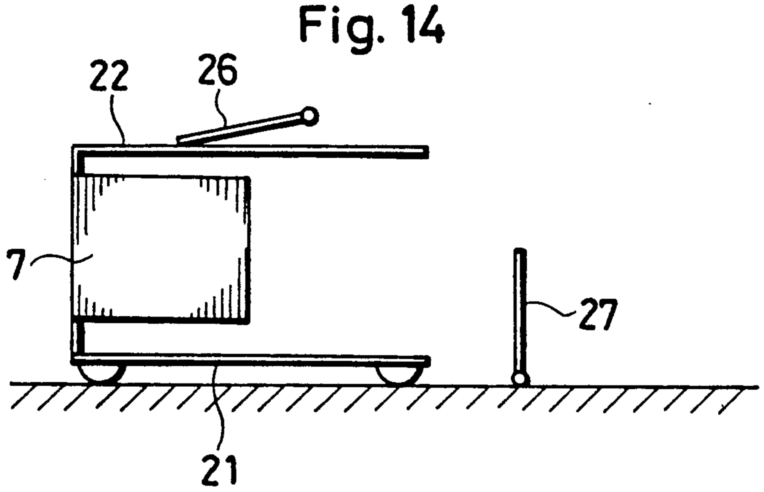
Figure 15:
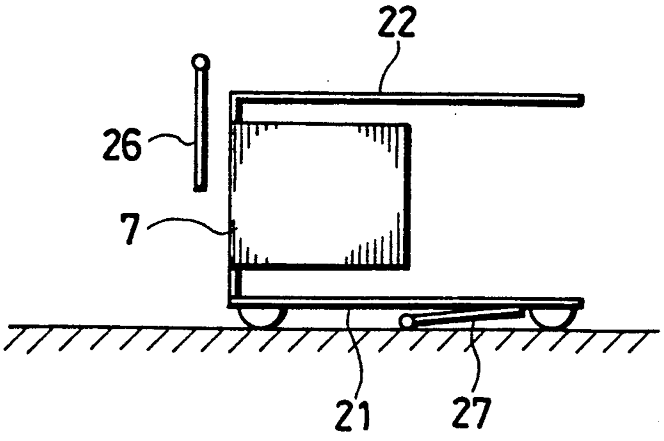

FIGS. 13 through 15 show how the shielding members 26 and 27 are switched over alternately in accordance with the magnification ratio.

During the same-size mode (FIG. 13), both the first shielding member 26 (same as in FIG. 9) and the second shielding member 27, which is laid down on the frame by the moving plate 21, are retracted from the optical path.

For enlargement (FIG. 12), the moving plate 21 is moved to the left and the shielding member 27 comes off from the moving plate 21 to stand on the frame. The first shielding member 26 is on the cover 22 (same as in FIG. 10).

For reduction (FIG. 13), the moving plate 21 is moved to the right and the second shielding member 27 is laid down by the moving plate 21. The first shielding member 26 is hung from the frame (same as in FIG. 11).

As shown above, the second shielding member 27 may be attached to the moving plate 21 or the frame. The first shielding member 26 may also be attached to the moving plate 21 or the frame. Any combination is possible. When the member 26 is attached on the moving plate 21, another member corresponding to the L-shaped plate 29 is required.

A construction wherein the shielding member 26 is attached to the frame and another construction wherein it is attached to the moving plate 21 are different in that the distance from the projecting lens 7 to the member 26 is changed while the magnification ratios are changed in the former. The former case will be explained in detail referring to FIGS. 16 and 17.

Figure 16:
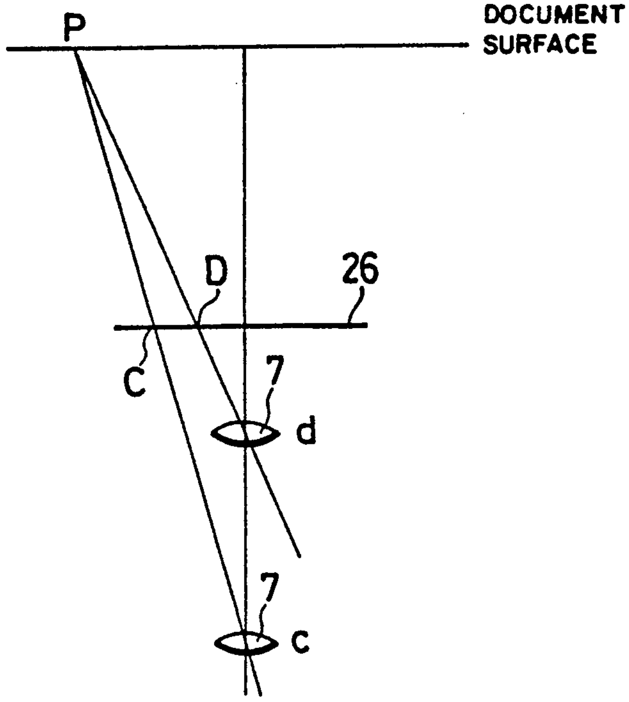
FIGS. 16, 17*a* and 17*b* show shielding conditions of light from a peripheral portion of the document in different reduction ratios of the second embodiment.
Figure 17A:
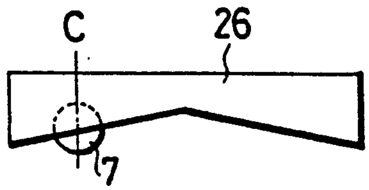
Figure 17B:
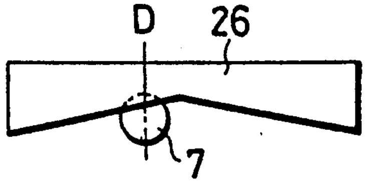

An optical path when the first shielding member 26 is attached to the frame is shown in FIG. 16. When the projecting lens 7 is at a point c, the light beam from a point P on the image surface of the document 2 passes through a point C of the member 26. When the projecting lens 7 is at a point d, the light beam from the point P passes through another point D of the member 26. The projecting lens 7 and the member 26 are seen from the above as shown in FIGS. 17*a* in the former and as shown in FIG. 17*b* in the latter. As apparent from these figures, a larger amount of light is shielded when the projecting lens 7 is at the point c than when it is at the point d. In other words, the farther the lens 7 is from the document 2 and the member 26 (namely, the higher the reduction ratio is), the larger the amount of shielded light is. As shown above, when the member 26 is attached to the frame, the amount of shielded light is greatly varied corresponding to the magnification ratio. On the other hand, when the member 26 is attached to the moving plate 21 to be moved integrally with the projecting lens 7, the amount of shielded light is less varied corresponding to the magnification ratio.

Figure 18:
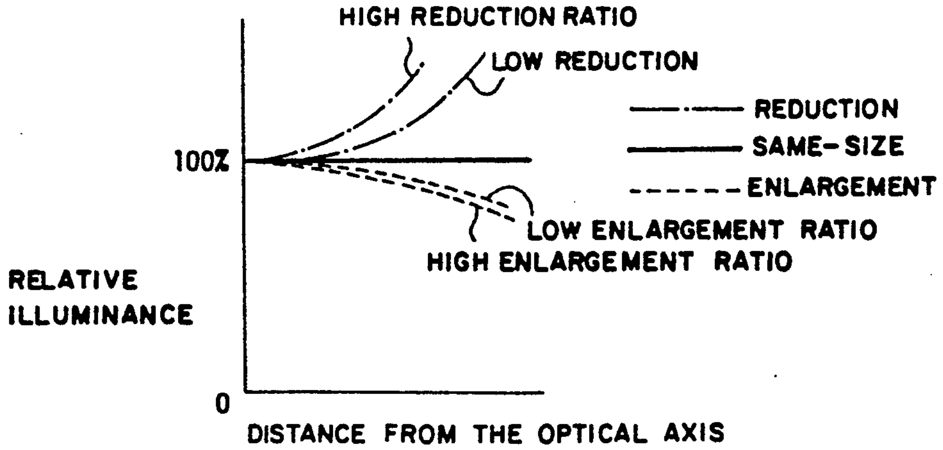
FIG. 18 is a graph showing illuminance distributions on the image on the projection plane in different magnification ratios.

As shown in FIG. 18, the non-uniformity in illuminance gets larger in proportion to the magnification ratio. To solve the problem that the non-uniformity in illuminance is varied in accordance with the magnification ratio, the above construction wherein the amount of shielded light is varied in accordance with the magnification ratio is extremely useful. It means that it is more desirable that the members 26 and 27 are attached to the frame than to the moving plate 21.

In a construction where the first shielding member is disposed between the lens and the document surface while the second shielding member is disposed between the lens and the projection surface as in the above, the following occurs when the lens is move for magnification change. As the magnification ratio is raised, the distance between the lens and the second shielding member is extended. On the other hand, as the magnification ratio is lowered, the distance between the lens and the first shielding member is extended. In accordance to the above phenomenon, the light amount shielded by the shielding members is also changed in the following manner: as the magnification ratio is lowered, the light amount shielded on the peripheral portion of the image is increased and the light amount shielded on central portion is decreased. That is why the light amount on both the peripheral and central portions of the image can be compensated accurately over a wide range of magnification ratios by combining the first and the second shielding members.

Practically, disposing the first shielding member 26 on the frame between the glass document table 1 and the lens 7 results in that the light amount shielded by the member 26 is increased as the magnification ratio is lowered. Disposing the second shielding member 27 between the lens 7 and the photoconductive drum 10 results in that the relative light amount shielded by the member 27 is increased as the magnification ratio is raised. The second embodiment is controlled so that the member 26 functions between the glass document table 1 and the lens 7 and the member 27 functions between the lens 7 and the photoconductive drum 10. Therefore, the most effective shielding is realized at any magnification ratio.

However, during the enlargement mode, the nonuniformity does not get so remarkably larger as during the reduction mode even if the enlargement ratio gets higher, and variation of the non-uniformity in illuminance is small. Therefore, it has little practical problem even if the member 27 is attached to the moving plate 21 to be moved integrally with the projecting lens 7. The member 27 attached to the moving plate 21 keeps shielding substantially the same amount of light irrespective of the ratio during the enlargement, and furthermore can be smaller than that attached on the frame to realize a compact image exposure device.

In the above embodiments, either of the first or the second shielding member does not operate during the most frequently used same size mode. Therefore, the light amount generated by the exposure lamp is efficiently used.

The shape of each shielding member depends on the range of magnification ratios and whether the document is to be aligned to a side of the glass document table or to a corner thereof.

Although the present invention has been fully described by way of embodiments with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A device for exposing a document image and projecting a reflected light therefrom to a projection surface through a lens, comprising:
- supporting means for supporting a document;
- irradiating means for irradiating a light on a document image of the document supported by said supporting means;
- a projection surface on which the document image is to be projected;
- a lens for receiving a reflected light from the document image and passing the reflected light onto said projection surface;
- lens driving means for moving said lens to change a size ratio of a projected image on said projection surface relative to the document image; and,
- first and second shielding members for compensating a nonuniformity of a light amount irradiated on said projection surface, said first shielding member being disposed on an optical path between said supporting means and said lens when the size ratio is less than a predetermined first ratio, and said second shielding member being disposed on an optical path between said lens and said projection surface when the size ratio is greater than a predetermined second ratio.

2. A device of claim 1, wherein the first shielding member has a shape with which said first shielding member reduces the light amount mainly from a peripheral portion of the document image and said second shielding member has a different shape with which said second shielding member reduces the light amount mainly from a central portion of the document image.

3. A device of claim 1 , further comprising retracting means for retracting at least one of said first and second shielding members from the optical path in accordance with a position of said lens.

4. A device of claim 3, wherein said retracting means retracts said second shielding member from the optical path when said lens is moved over a first specified position toward said projection surface along the optical path.

5. A device of claim 4, wherein said retracting means retracts said first shielding member from the optical path when said lens is moved over a second specified position toward said supporting means along the optical path, the second specified position being between the first specified position and said projection surface on the optical path.

6. A device of claim 4, wherein said retracting means retracts both of said first and second shielding members from the optical path when the projected image on said projection surface and the document image are 1:1 in size.

7. A device of claim 1, wherein said second shielding member is provided integrally with said lens for integral movement therewith.

8. A device of claim 1, wherein said lens driving means moves said lens to vary distances between said lens and said first shielding member and between said lens and said second shielding member.

9. A device for exposing a document image and projecting a reflected light therefrom to a projection surface through a lens, wherein projection magnification is changeable substantially steplessly, the device comprising:
- supporting means for supporting a document;
- irradiating means for irradiating a light on a document image of the document supported by said supporting means;
- a projection surface on which the document image is to be projected;
- a lens for receiving the reflected light from the document image and passing the reflected light onto said projection surface; and
- a first shielding member for partially shielding the reflected light at a specified position on an optical path between said supporting means and said lens when the image is reduced in size and projected on said projection surface;
- a second shielding member for partially shielding the reflected light at another specified position on the optical path between said lens and said projection surface when the document image is enlarged in size and projected on said projection surface, and
- moving means for moving said lens so as to change a positional relationship between said first and second shielding members with said lens.

10. A device of claim 9, further comprising prohibiting means for prohibiting said second shielding member from operating when the image of the document is reduced in size and projected on said projection surface and for prohibiting said first shielding member from operating when the image of the document is enlarged in size and projected on said projection surface.

11. A device of claim 9, wherein said moving means causes said first shielding member to be out of the optical path when the image is projected with enlarged magnification and causes said second shielding member to be out of the optical path when the image is projected with reduced magnification.

12. A device for exposing a document image and projecting a reflected light therefrom to a projection surface through a lens, comprising:
- supporting means for supporting a document;
- irradiating means for irradiating a light on the document;
- scanning means for moving said irradiating means relative to the document;
- lens means for receiving a reflected light from the document;
- a projection surface on which a document image of the document is projected through said lens means;
- a first shielding member movably disposed at a specific position on an optical path between said supporting means and said lens means for compensating any uneven light amount of a projected image projected on said projection surface;
- moving means for moving said lens means so as to change a positional relationship of said first shielding member relative to said lens means and the optical path;
- a second shielding member disposed on the optical path between said supporting means and said projection surface for compensating any uneven light amount of a projected image projected on said projection surface, said second shielding member moving integrally with said lens means; and retracting means for retracting said second shielding member from the optical path when said lens means is moved over a first specific position toward said projection surface along the optical path.

13. A device of claim 12, wherein said moving means causes said first shielding member to be out of the optical path when said lens means is moved over a second specific position toward said supporting means along the optical path, the second specific position being between said first specific position and said projection surface on the optical path.

14. A device of claim 1, wherein said first ratio is less than said second ratio.

15. A device of claim 1, wherein said projection surface is a photoconductive drum.

16. A device for exposing a document image and projecting a reflected light therefrom to a projection surface through a lens, comprising:

supporting means for supporting a document;

irradiating means for irradiating a light on a document image of the document supported by said supporting means;

a projection surface on which the document image is to be projected;

a lens for receiving a reflected light from the document image and passing the reflected light onto said projection surface;

means for changing a size ratio of a projected image on said projection surface relative to the document image;

a first shielding member adapted to be disposed on an optical path between said supporting means and said lens for compensating a nonuniformity of a light amount irradiated on said projection surface;

a second shielding member adapted to be disposed on the optical path between said lens and said projection surface for compensating a nonuniformity of the light amount irradiated on said projection surface, and means for selectively inserting one of said first and second shielding members in the optical path.

17. A device of claim 16, wherein said inserting means operates in accordance with the size ratio.

18. A device for projecting a document image to a projection surface through a lens, comprising:

projecting means for projecting a document image;

a projection surface on which the document image is to be projected;

a lens for receiving a light from the projecting means and passing the light onto said projection surface;

lens driving means for moving said lens to change a size ratio of a projected image on said projection surface relative to the document image;

first shielding means for shielding a part of the light between said projecting means and said lens when the size ratio is less than a predetermined first ratio, and second shielding means for shielding a part of the light between said lens and said projection surface when the size ratio is greater than a predetermined second ratio.

19. In an apparatus for projecting a document image to a projection surface by projecting means through a lens, said apparatus being capable of changing a size ratio of a projected image on the projection surface relative to the document image, a method for compensating a nonuniformity of a light amount of the projected image comprising the steps of:

shielding a part of the light from the projecting means at a position preceding the lens when the size ratio is less than a predetermined first ratio, and shielding a part of the light from the projecting means at a position between the lens and the projection surface when the size ratio is greater than a predetermined second ratio.

20. A device for exposing a document image and projecting a reflected light therefrom to a projection surface through a lens, comprising:

supporting means for supporting a document;

irradiating means for irradiating a light on a document image of the document supported by said supporting means;

a projection surface on which the document image is to be projected;

a lens for receiving a reflected light from the document image and passing the reflected light onto said projection surface;

a first shielding member disposed on an optical path between said supporting means and said lens for compensating a nonuniformity of a light amount irradiated on said projection surface, said first shielding member having a shape with which said first shielding member reduces the light amount mainly from a peripheral portion of the document image;

a second shielding member disposed on the optical path between said lens and said projection surface for compensating a nonuniformity of the light amount irradiated on said projection surface, said second shielding member having a different shape than said first shielding member, whereby said second shielding member reduces the light amount mainly from a central portion of the document image, and lens driving means for moving said lens to change a size ratio of a projected image on said projection surface relative to the document image on and to vary distances between said lens and said first shielding member and between said lens and said second shielding member.

* * * * *